May 25, 1954   W. P. UHLER   2,679,378
HIGH-PRESSURE VALVE
Filed Oct. 27, 1949   2 Sheets-Sheet 1
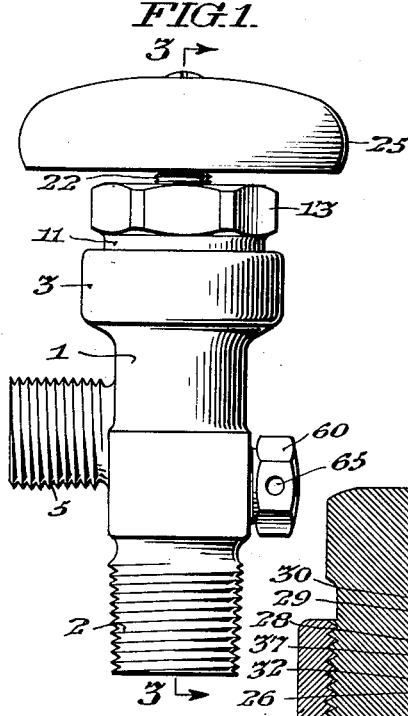
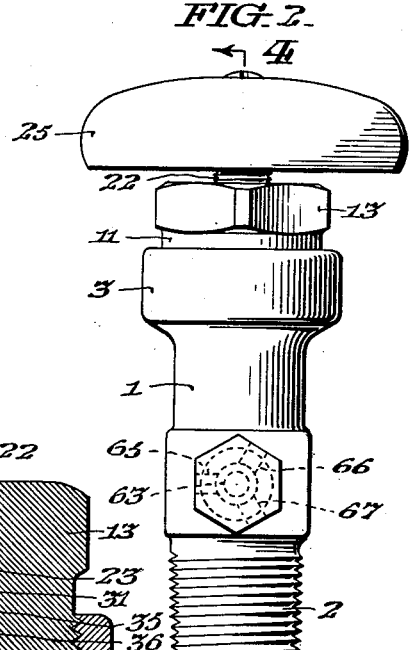
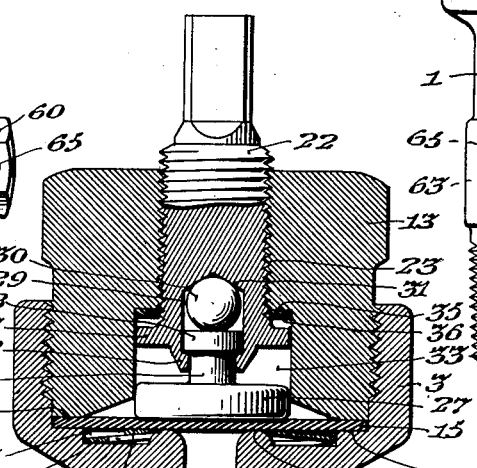
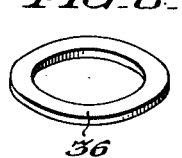
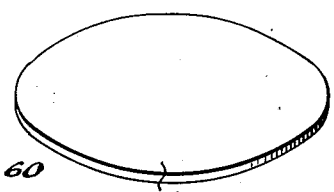
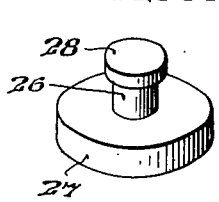
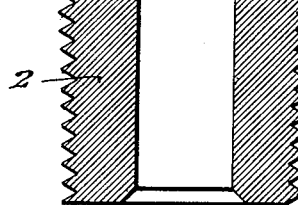
Inventor
Wilmer P. Uhler,
By Clifton C. Hallowell
Attorney May 25, 1954
W. P. UHLER
2,679,378
HIGH-PRESSURE VALVE
Filed Oct. 27, 1949
2 Sheets-Sheet 2
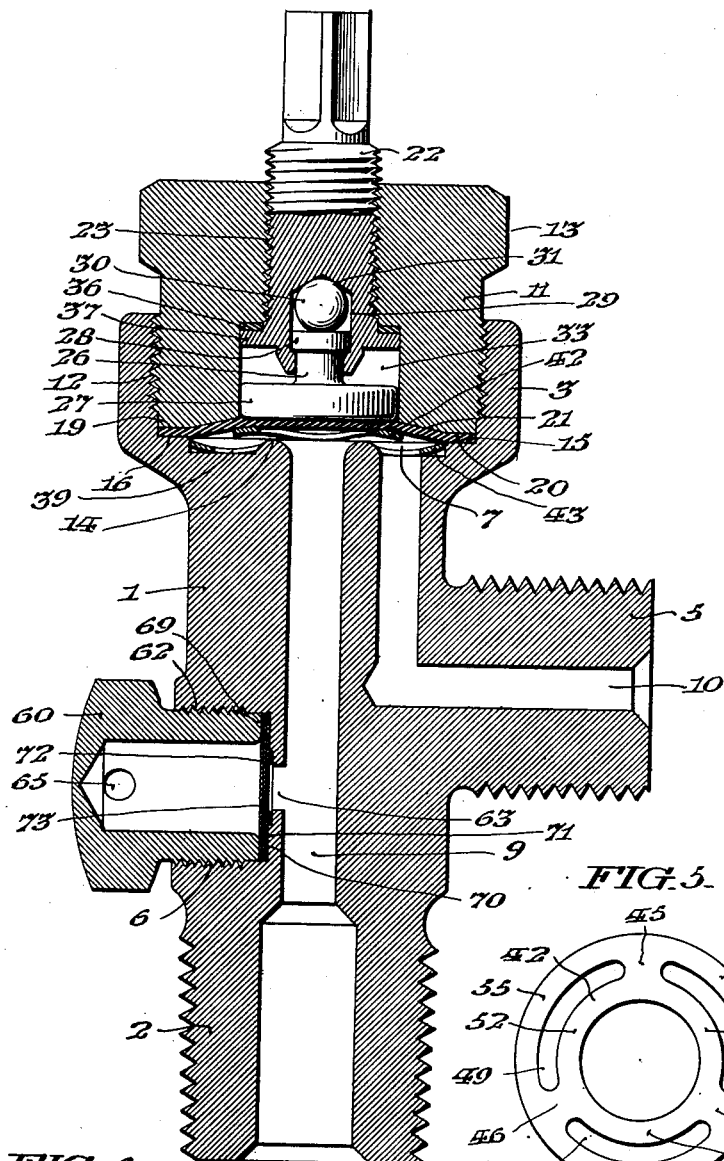
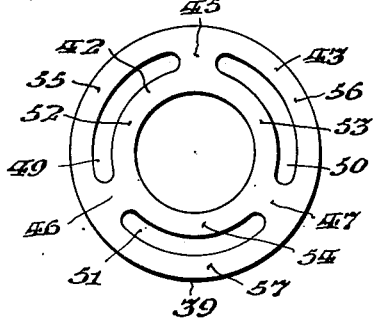
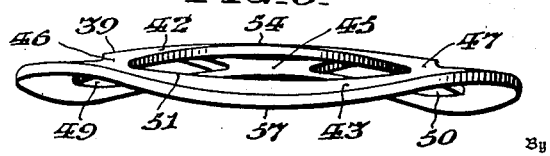
Inventor
Wilmer P. Uhler,
By Clifton C. Hallowell
Attorney Patented May 25, 1954

2,679,378

UNITED STATES PATENT OFFICE 2,679,378

HIGH-PRESSURE VALVE

Wilmer P. Uhler, Tottenville, N. Y., assignor to The S. S. White Dental Manufacturing Company, a corporation of Pennsylvania Application October 27, 1949, Serial No. 123,879

1 Claim. (Cl. 251—331)

My invention relates particularly to that class of valves that are commonly known as diaphragm valves and are also designated as packless valves, and is especially directed to spring actuated diaphragm control.

It has been found in practice that valves of the type contemplated have not fulfilled the requirements for which they were designed, and have failed to prevent leakage under all circumstances, of gases such as propane, butane, acetylene oxide, and possibly other gases that are generally stored or contained in tanks, cylinders or other suitable containers at high pressures, to which such valves may be connected for the purpose of controlling the flow of the contents therefrom.

The principal objects of my invention are to provide a high pressure valve that may be easily operated to efficiently control the flow of gas or fluid under high pressures from the storage container to a receiving container or other associated apparatus without possible accidental escape as by leakage or otherwise, by the employment of greatly simplified but highly efficient mechanism.

Other objects of my invention are to provide a high pressure diaphragm valve that is simple in its construction, economical to manufacture, that affords ease of replacement of worn or otherwise defective parts whereby to prolong its useful operating life, and that upon rupture of the controlling diaphragm or failure of the co-operating parts to function normally said valve may be operated in a manner to effectively prevent the escape of gas to the atmosphere.

My invention further contemplates the employment of a valve stem comprising a relatively yielding link terminating in a valve disk and having an interposed ball bearing to facilitate its ease of actuation.

The form of my invention as hereinafter described comprehends a valve body having a chamber connected with inlet and outlet passageways that are arranged to be controlled by a resilient disk of tough pliant material extended across the inlet passageway and normally resting upon an annular valve seat concentric with said inlet passageway when forced thereagainst by the ball bearing link of the valve stem in opposition to a perforated circular spring situated in said chamber beneath said resilient disk.

My invention also includes all of the various novel features of construction and arrangement as hereinafter more definitely specified.

In the accompanying drawings, Figure 1 is a front elevational view of a valve constructed in accordance with my invention; Fig. 2 is a side elevational view as seen from the right of Fig. 1; Fig. 3 is an enlarged central transverse vertical sectional view of said valve taken on the line 3—3 in Fig. 1, showing the valve diaphragm and its associated mechanism in closed position; Fig. 4 is an enlarged central transverse vertical sectional view of said valve taken on the line 4—4 in Fig. 2, showing the valve diaphragm and its associated mechanism in open position; Fig. 5 is a plan view of the diaphragm supporting spring; Fig. 6 is a front elevational view, on a greatly enlarged scale, of said diaphragm supporting spring; Fig. 7 is a perspective view of the valve diaphragm; Fig. 8 is a perspective view of the annular washer that seals the valve stem; and Fig. 9 is a perspective view of the valve stem link and diaphragm follower.

In said figures, the valve body has a first body member 1 which comprises the depending externally screw threaded inlet boss 2, the upwardly extending cylindrical valve housing 3, the laterally extending externally threaded outlet boss 5 and the threaded bore 6 arranged to receive the safety valve assembly to be hereinafter described.

The valve chamber 7, which connects the inlet passageway 9 entering through the threaded boss 2, with the outlet passageway 10 discharging through the externally threaded boss 5, is disposed within the valve housing 3, and is closed by a second body member in the form of the hollow valve plug 11 serving as a valve cap which is screw-threadedly engaged with the internal screw threads 12 in said valve housing 3 outside the region of the diaphragm 15, and has the hexagonal flange 13 by which it may be conveniently adjusted.

The floor of the valve chamber 7 is provided with the slightly raised annular valve seat 14, in the form of a half round bead or ridge, encircling the inlet passageway 9 and upon which seat the valve diaphragm 15 cooperates to effect closing of the inlet passageway 9, as shown in Fig. 3, and said floor is also provided with a shoulder portion providing the raised annular second seat 16 concentric with the valve seat 14 and embracing both the inlet passageway 9 and the outlet passageway 10 and providing an annular groove bounded at its inner periphery by the valve seat 14; the outlet passageway opens into this groove.

The valve diaphragm 15 may be composed of any suitable material that is tough and pliable such as polyamide resin and is preferably in the form of a thin flat disk and has its peripheral margin 19 engaged in seal tight relation with the seat 16 by the inner plane edge 20 of the valve plug 11.

Referring to Figures 3 and 4, the inner margin of the hollow valve plug 11 is chamfered to form the conical surface 21 which is designed to provide a rest or support for the diaphragm 15 when flexed upwardly by the pressure of the gas in the valve chamber 7 in its passage from the inlet passageway 9 to the outlet passageway 10, as shown in Fig. 4, wherein the operative parts are illustrated in open position.

The valve diaphragm 15 is arranged to be controlled to close or open the valve passageways 9 and 10, as may be desired, by the screw threaded valve stem 22 which is threadedly engaged with the screw threads of the bore 23 in the valve plug 11 and may be rotated by the handwheel 25 to advance or permit retraction of said diaphragm 15 through the intervention of its relatively adjustable link comprising the shank 26 terminating downwardly in the disk-like follower or actuator 27 bearing upon the valve diaphragm 15 and having the upwardly disposed flanged head 28.

As shown in Figs. 3 and 4, said head 28 extends into the bore 29 which is provided in the inner end of the valve stem 22, and bears against the bearing ball 30 which is engaged to roll upon the conical inner surface 31 of the bore 29, and said flanged head 28 is retained in said bore 29 by the inturned flange 32 which may be spun or otherwise formed at the lower extremity of said valve stem 22.

Referring again to Figs. 3 and 4, the threaded bore 23 broadens inwardly into a somewhat greater diameter to provide the circular chamber 33 for the reception of the follower 27 and also to provide the annular seat 35 for the annular resilient gasket 36 which may be forced into gas-tight relation with said seat 35, by the laterally extending flange 37 projecting radially from the valve stem 22, when said valve stem is retracted by anti-clockwise rotation of the hand wheel 25 to open the valve passageways 9 and 10.

The valve diaphragm 15 is arranged to be forced upwardly against the follower 27 by the specially designed spring 39 illustrated in Figs. 3, 4, 5 and 6 and comprising the annular unitary structure composed of inner and outer concentric continuous rings 42 and 43 respectively, which are connected by spoke-like webs 45, 46 and 47 respectively that afford the circularly arranged, intervening, elongated arcuate perforations 49, 50 and 51 respectively, all associated to provide a highly resilient spring unit to perform the desired function of uniformly uplifting the valve diaphragm 15 and maintaining it free from the valve seat 14 when the follower 27 is withdrawn to its open position to permit passage of gas through the valve chamber 7 from the inlet passageway 9 to the outlet passageway 10. The inner periphery of the inner ring has a diameter greater than that of the valve seat 14 and less than that of the follower 27: and the outer periphery of the outer ring is guided by the inner edge of the shoulder portion which provides the second valve seat 16.

As best illustrated in Figs. 5 and 6, the rings 42 and 43 are oppositely undulated, the inner ring 42 curving upwardly between the spoke-like webs 45, 46 and 47, while the outer ring 43 curves downwardly between said webs, so that, as will be obvious, relatively spaced imaginary parallel planes would respectively be tangent to the crests of the three upwardly curved regions 52, 53 and 54 of the inner ring 42, and to the inverted crests of the three downwardly curved regions 55, 56 and 57 of the outer ring 43.

The operation of the valve from closed position shown in Figure 3 to the open position shown in Figure 4 is effected by counter-clockwise rotation of the hand-wheel 25, which produces an upward axial movement of the threaded valve stem 22 and its link including the follower 27, thereby relieving the pressure exerted on the diaphragm 15 which is contemporaneously moved away from the valve seat 14 by the expansion of the spring 39 to provide communication from the inlet passageway 9 through the valve chamber 7 to and through the outlet passageway 10; such rotation of the hand-wheel 25 and valve stem 22 also effects the sealing of the chamber 33 by pressure of the flange 37 against the gasket 36, as shown in Fig. 4, thus preventing leakage of gas even if rupture of the valve diaphragm 15 should accidentally occur.

The tension of the spring 39 is sufficiently high as to insure the uplifting of the diaphragm 15 from its closed position in contact with the annular valve seat 14 to its fully open position, as illustrated in Fig. 4, upon withdrawal of the follower 27.

The uniformly high pressure of the spring 39 when the valve diaphragm 15 is in its closed position, depressed by the follower 27, is such as to cause said diaphragm to follow the movement of the follower 27 to its fully open position, thus assuring full flow and the thorough exhaust of the gas from the storage container under low pressure without effecting the rate of flow which would otherwise occur by premature restrictions of the gas passageway, thus preventing the danger of possible asphyxiation of persons using a poisonous gas that may remain in the storage container at a pressure which would be insufficient to cause the automatic operation of the diaphragm but which might escape freely to the atmosphere upon the removal of the valve from said storage container.

Should the valve diaphragm 15 be accidentally ruptured or perforated, as by a great number of opening or closing manipulations, the valve may be sealed in its maximum open position by the cooperation of the flange 37 on the valve stem 22, pressing against the gasket 36 so as to prevent the escape of gas through the space between the screw threads of the valve stem 22 and valve plug 11.

Upon rotation of the stem 22 in the opposite direction, it moves the follower or actuator 27 downwardly, thereby bringing the diaphragm 15 against the valve seat 14. The actuator 27 also acts through the diaphragm 15 to press downwardly upon the crests of the inner ring 42 for reducing the curvature of the same and therewith causes downward movement of the webs 45, 46, 47 and a like reduction of the curvature of the curved regions of the outer ring 43; so that the spring is relatively flattened and pressed into the annular groove.

The valve as shown in Figs. 3 and 4 may be provided with the safety exhaust mechanism which, in the form illustrated, comprises the hollow screw plug 60 which is threadedly engaged with the laterally extended threaded bore 62 connected by the short passageway 63 with the inlet passageway 9, and which has the outlet orifices 65, 66 and 67 for the escape of gas under excessive pressures.

Said hollow screw plug 60 has its inner annular edge margin 69 opposed to the shoulder 70 with an interposed lead annulus 71 bearing against said shoulder 70, a disk 72 of copper bearing against the edge margin 69 of said plug 60 and a disk 73 of tin disposed between the copper disk 72 and said lead annulus 71, the lead annulus being provided to form a seal between the shoulder 70 and the tin disk 73, while said tin disk serves as a shield to protect said copper disk from corrosive action of the gas in the container.

In the safety valve assembly illustrated in Fig. 3, the frangible copper disk 72 and its protective tin disk 73 are designed to burst should the gas in the gas container exceed a predetermined pressure, whereby said gas may escape through the hollow screw plug 60 and its outlet orifices 65, 66 and 67.

I do not desire to limit my invention to the precise details of construction and arrangement as herein set forth, as it is obvious that various modifications may be made therein without departing from the essential features of my invention as defined in the appended claim.

Having thus described my invention, I claim:

A high pressure control valve comprising a first body member having an inlet passageway, a raised valve seat around the inner end of the inlet passageway, said first body member having an enlarged chamber surrounding said valve seat and defined by the edge of a shoulder portion; a flexible diaphragm seated on the shoulder portion and extending across the valve seat for closing the same; a second body member connected with the first body member outside the region of the shoulder portion and engaged with the diaphragm to hold the same sealed upon the shoulder portion; a valve actuator movable axially in the second body member for moving the diaphragm against the valve seat, said actuator having a diameter greater than that of the valve seat; said valve seat and said shoulder portion defining an annular groove, said first body member having an outlet passageway opening into said groove; and a spring located between the diaphragm and the floor of the groove for lifting the diaphragm from said seat, said spring being a unit structure comprised of continuous outer and inner rings held in spaced relation by spoke-like connecting webs with arcuate perforations between the webs, the outer ring being downwardly curved between the webs and the inner ring being upwardly curved between the webs, the crests of the curved portions of the outer ring being seated in the groove and guided by the shoulder portion, the inner periphery of the inner ring having a diameter greater than that of the valve seat and less than that of the actuator, whereby upon closing movement of the actuator the pressure therefrom acts on the diaphragm for seating the same upon the valve seat and also acts through the diaphragm upon the crests of said curved portions of the inner ring for compressing the same and the curved portions of the outer ring toward flat form and into the said groove.

References Cited in the file of this patent

UNITED STATES PATENTS

| Number | Name | Date |
|---|---|---|
| 1,176,632 | Werner | Mar. 21, 1916 |
| 1,450,078 | Haunz | Mar. 27, 1923 |
| 1,763,927 | Ireland | June 17, 1930 |
| 2,100,464 | Almen et al. | Nov. 30, 1937 |
| 2,277,395 | Franck | Mar. 24, 1942 |
| 2,509,834 | More | May 30, 1950 |

FOREIGN PATENTS

| Number | Country | Date |
|---|---|---|
| 2,222 | Great Britain | 1872 |
| 545,683 | Great Britain | 1942 |
| 553,224 | Great Britain | 1943 |